(12) United States Patent
Xu

(10) Patent No.: US 9,247,452 B2
(45) Date of Patent: Jan. 26, 2016

(54) PASSIVE RADIO LINK CONTROL ENTITY WITH UNIFIED INTERFACE

(75) Inventor: Changlong Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,708

(22) PCT Filed: Sep. 12, 2012

(86) PCT No.: PCT/CN2012/081272
§ 371 (c)(1),
(2), (4) Date: Aug. 26, 2014

(87) PCT Pub. No.: WO2014/040236
PCT Pub. Date: Mar. 20, 2014

(65) Prior Publication Data
US 2014/0362767 A1    Dec. 11, 2014

(51) Int. Cl.
*H04W 4/00* (2009.01)
*H04L 12/26* (2006.01)
*H04W 28/04* (2009.01)
*H04L 1/18* (2006.01)
*H04W 28/06* (2009.01)
*H04W 88/08* (2009.01)
*H04W 76/02* (2009.01)

(52) U.S. Cl.
CPC .............. *H04W 28/04* (2013.01); *H04L 1/18* (2013.01); *H04W 28/06* (2013.01); *H04W 88/08* (2013.01); *H04W 76/022* (2013.01)

(58) Field of Classification Search
None
See application file for complete search history.

(56) References Cited

U.S. PATENT DOCUMENTS

| | | | |
|---|---|---|---|
| 2009/0221242 A1 | 9/2009 | Bergstrom et al. | |
| 2010/0091709 A1 | 4/2010 | Yi et al. | |
| 2010/0165937 A1* | 7/2010 | Yi et al. | 370/329 |
| 2012/0195185 A1* | 8/2012 | Kumar et al. | 370/216 |

FOREIGN PATENT DOCUMENTS

CN    1355638 A    6/2002

OTHER PUBLICATIONS

International Search Report and Written Opinion received for Patent Application No. PCT/CN2012/081272, mailed on Jun. 6, 2013, 11 pages.

* cited by examiner

Primary Examiner — Kiet Tang
(74) Attorney, Agent, or Firm — Stoel Rives LLP

(57) ABSTRACT

The techniques introduced here provide a single, passive radio link control entity with a unified interface. The unified interface is configured to receive a request for a RLC service of a plurality of RLC services from upper and lower protocol layers. The unified interface is coupled with a processing module to process the request. The radio link control entity further includes a plurality of data transfer modules configured to provide data transfer between upper and lower protocol layers, the interface modules are coupled with the processing module and the unified interface. The single, passive radio link control entity provides bi-directional data transfer services for TM, UM, and AM data transmissions.

9 Claims, 4 Drawing Sheets

PASSIVE RADIO LINK CONTROL ENTITY WITH UNIFIED INTERFACE

BACKGROUND

In the past few decades, telephone systems have evolved continuously at an accelerated rate. Networks operating under the Universal Mobile Telecommunications System (UMTS) Long Term Evolution (LTE) standard, initiated by the third-generation partnership project (3GPP), include new radio access technology and core radio network architecture that provide high data rate, low latency, packet optimization, and improved system capacity and coverage. In LTE networks, an evolved universal terrestrial radio access network (EUTRAN) includes a plurality of evolved Node-Bs (eNodeBs) and communicates with a plurality of mobile terminals, also referred to as user equipments (UEs).

BRIEF DESCRIPTION OF THE DRAWINGS

One or more embodiments of the present invention are illustrated by way of example and not limited by the figures of the accompanying drawings, in which like references indicate similar elements.

DETAILED DESCRIPTION

Figure 1:
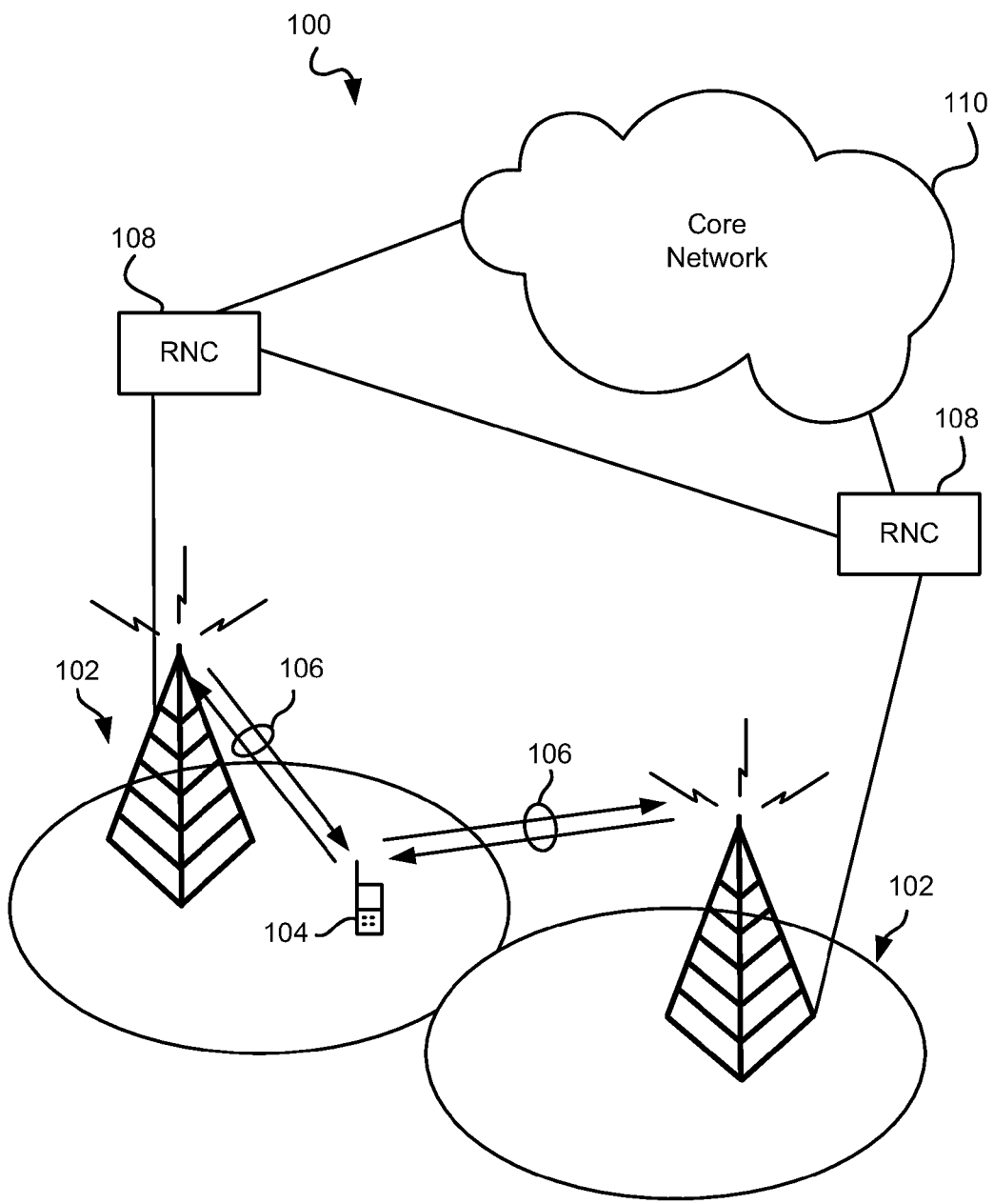
FIG. 1 shows an example architecture of a cellular network.

In an LTE network, the communication protocol layers are based on the Open System Interconnection (OSI) standard model, which is well-known in communication systems, and can thus be divided into three layers. The data link layer includes three sub-layers: a media access control (MAC) sub-layer; a radio link control (RLC) sub-layer; and a packet data convergence protocol (PDCP) sub-layer. In traditional LTE network equipment (e.g., eNodeB and UE), functions of the RLC sub-layer are performed by separate RLC entities based on which transmission mode is specified. An RLC entity can be configured to perform data transfer in one of the following transmission modes: transparent mode (TM); unacknowledged mode (UM); and acknowledged mode (AM).

The main function of an RLC entity is to receive/deliver RLC service data units (SDUs) from/to upper layers and send/receive RLC protocol data units (PDUs) to/from a peer RLC entity via lower layers. In conventional designs such as a digital signal processing (DSP) solution, the procedure and interfaces between the upper layer, the lower layers, and the RLC include many control messages that are transferred between each layer. The fact that multiple messaging procedure and interfaces are needed (e.g., at least one for each transmission mode) makes efficient implementation of the RLC sub-layer complex and difficult. This problem is magnified when layers are implemented using different technologies. For example, if the data link layer (L2) is implemented using a DSP solution and the physical layer (L1) is implemented using a field programmable gate array (FPGA) solution, additional information, such as timing, and handshaking signals are be transmitted back and forth in order to ensure quality transmission. The number of messages required makes the procedure and interfaces in this example solution complicated to implement.

Therefore, a need exists for a single, passive RLC entity to perform the functions for all transmission modes through a unified interface that would reduce the number of control messages and alleviate timing issues that arise in conventional RLC entity designs.

The techniques introduced herein provide a single, passive radio link control entity with a unified interface. According to one embodiment, the unified interface is configured to receive a request for a RLC service of a plurality of RLC services from upper and lower protocol layers. The unified interface is coupled with a processing module to process the request. The radio link control entity further includes a plurality of data transfer modules configured to provide data transfer between upper and lower protocol layers, the interface modules are coupled with the processing module and the unified interface. The single, passive radio link control entity provides bi-directional data transfer services for TM, UM, and AM data transmissions. Other aspects of the techniques summarized above will be apparent from the accompanying figures and the detailed description that follows.

References in this specification to "an embodiment," "one embodiment," or the like, mean that the particular feature, structure or characteristic being described is included in at least one embodiment of the present invention. Occurrences of such phrases in this specification do not necessarily all refer to the same embodiment.

FIG. 1 shows an example architecture of a cellular network 100. The example network includes base stations 102 and a mobile terminal 104 (also referred to herein as "user equipment" or "UE"). The term "base station" as used herein is a generic term. As will be appreciated by those skilled in the art, in an evolved UMTS Terrestrial Radio Access Network (EUTRAN), such as one used in the LTE architecture, the base station 102 may be an evolved NodeB (eNodeB or eNB). However, the term "eNodeB" is also broader in some senses than the conventional base station since the eNodeB refers, in general, to a logical node. The term "base station" as used herein is inclusive of a base station, a NodeB, an eNodeB or other nodes specific for other architectures. An eNodeB in an LTE system can handle transmission and reception in one or several cells.

The mobile terminal 104 uses a dedicated channel 106 to communicate with the base station 102, e.g., by transmitting or receiving RLC PDU segments and SDU segments according to example embodiments described below. The base station 102 is connected to a corresponding radio network controller (RNC) 108. Although not shown as such in FIG. 1, it will be appreciated that each RNC 108 may control more than one base station 102. The RNC 108 is connected to a core network 110. In the LTE architecture, the core network 110 is an evolved packet core (EPC).

As introduced above, the EUTRAN is a wireless communication network using the air interface defined by the 3GPP's LTE standards. EUTRAN is also referred to as the 3GPP work item on the Long Term Evolution and the evolved universal terrestrial radio access (EUTRA) in early drafts of the 3GPP LTE specification. The EUTRAN is a radio access network standard meant to replace the UMTS, high-speed downlink packet access (HSDPA), and high-speed uplink packet access (HSUPA) technologies specified in 3GPP releases 5 and beyond. EUTRAN provides higher data rates, lower latency, and is optimized for packet data.

Figure 2:
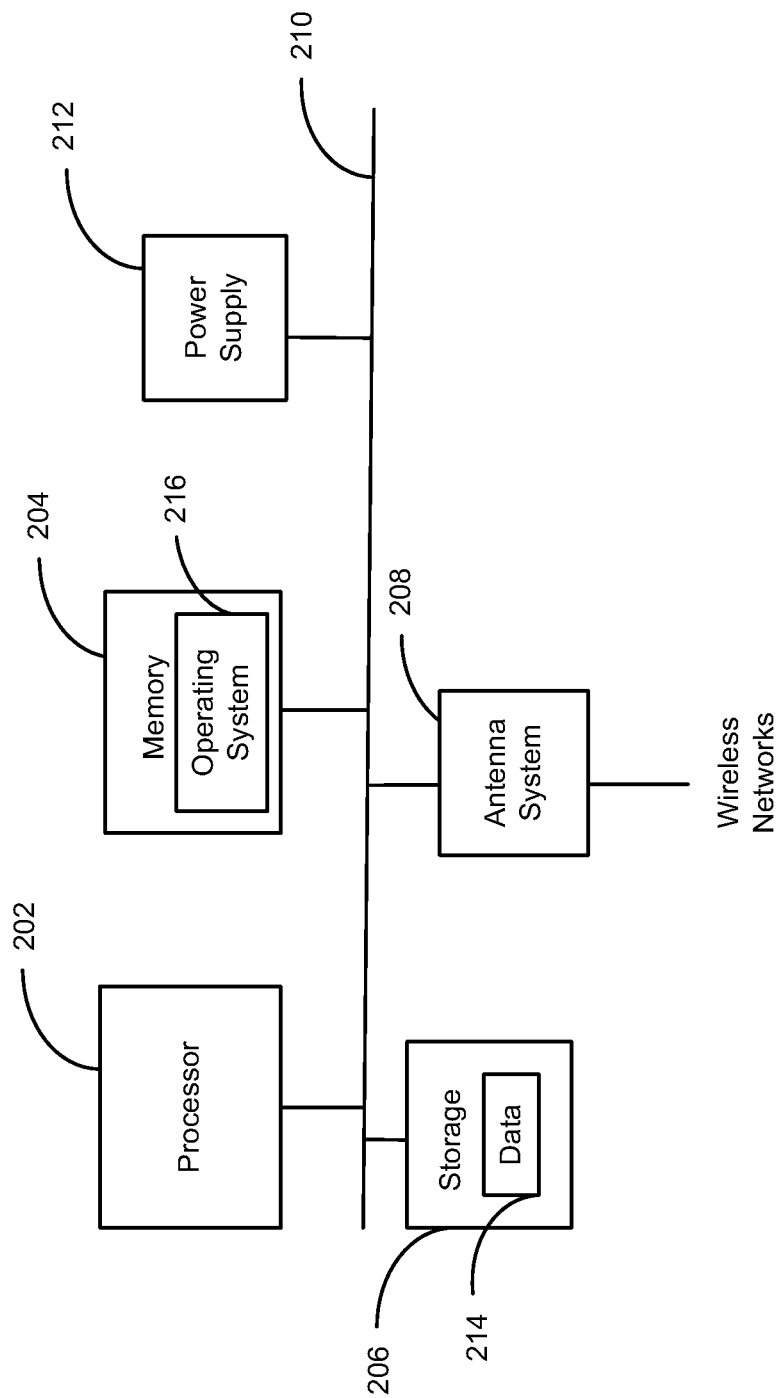
FIG. 2 is a high-level block diagram showing an example of the architecture of a base station.

FIG. 2 is a high-level block diagram showing an example of the architecture of a base station, for example base station 102. In the illustrated embodiment, the base station architecture is a processing system that includes a processor subsystem 202 that can include one or more processors. The base station architecture further includes a memory 204, a storage module 206, and an antenna system 208, each interconnected by an interconnect 210 and powered by a power supply 212.

The base station architecture can be embodied as a single- or multi-processor system that preferably implements a high-level module to send and receive data to and from a mobile terminal, for example, mobile terminal 104. The data is communicated via the antenna system 208, which can include a single antenna or multiple antenna system capable of receiving and transmitting data on one or more frequencies. The data 214 can be stored in the storage module 206 so that it can be retrieved by the processor subsystem 202 and memory 204.

The memory 204 illustratively comprises storage locations that can be addressed by the processor subsystem 202 and the base station architecture's other components for storing software program code and data structures. The processor subsystem 202 and the associated components may, in turn, include processing elements and/or logic circuitry configured to execute the software code and manipulate the data structures. The operating system 216, portions of which are typically resident in memory 204 and executed by the processor subsystem 202, functionally organizes the base station architecture by, among other things, processing PDU and SDU segments according to the techniques introduced herein. It will be apparent to those skilled in the art that other processing and memory implementations, including various computer readable storage media, may be used for storing and executing program instructions pertaining to the technique introduced herein.

Figure 3:
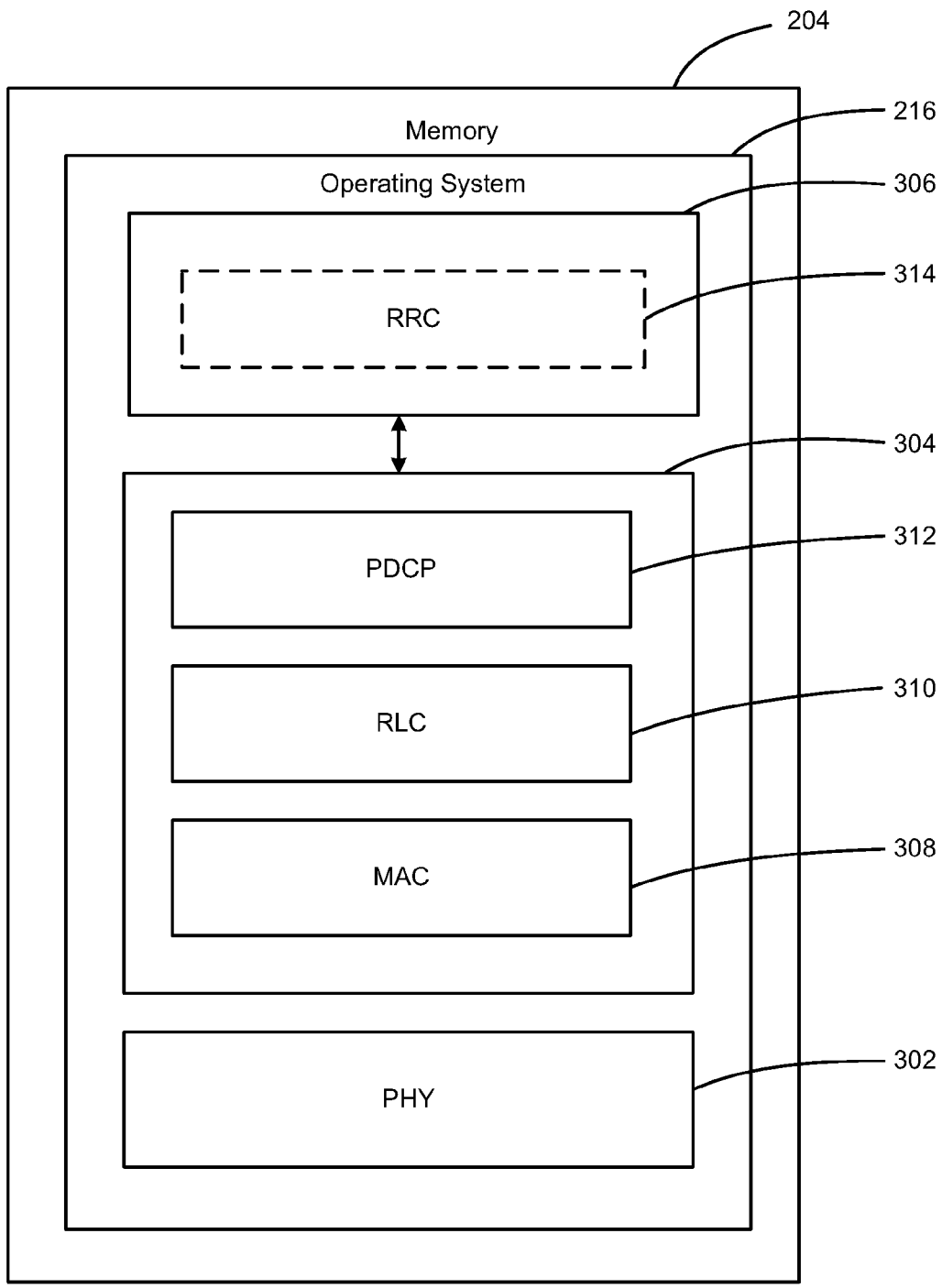
FIG. 3 is a schematic illustration of an example architecture of a base station operating system.

FIG. 3 is a schematic illustration of an example architecture of a base station operating system including a high-level module to send/receive data to/from a mobile device. In one embodiment, the base station memory 204 stores the operating system 216 which is then executed by the processor subsystem 202. The operating system 216 supports a radio interface protocol for use in communicating with the mobile terminal 104.

Figure 4:
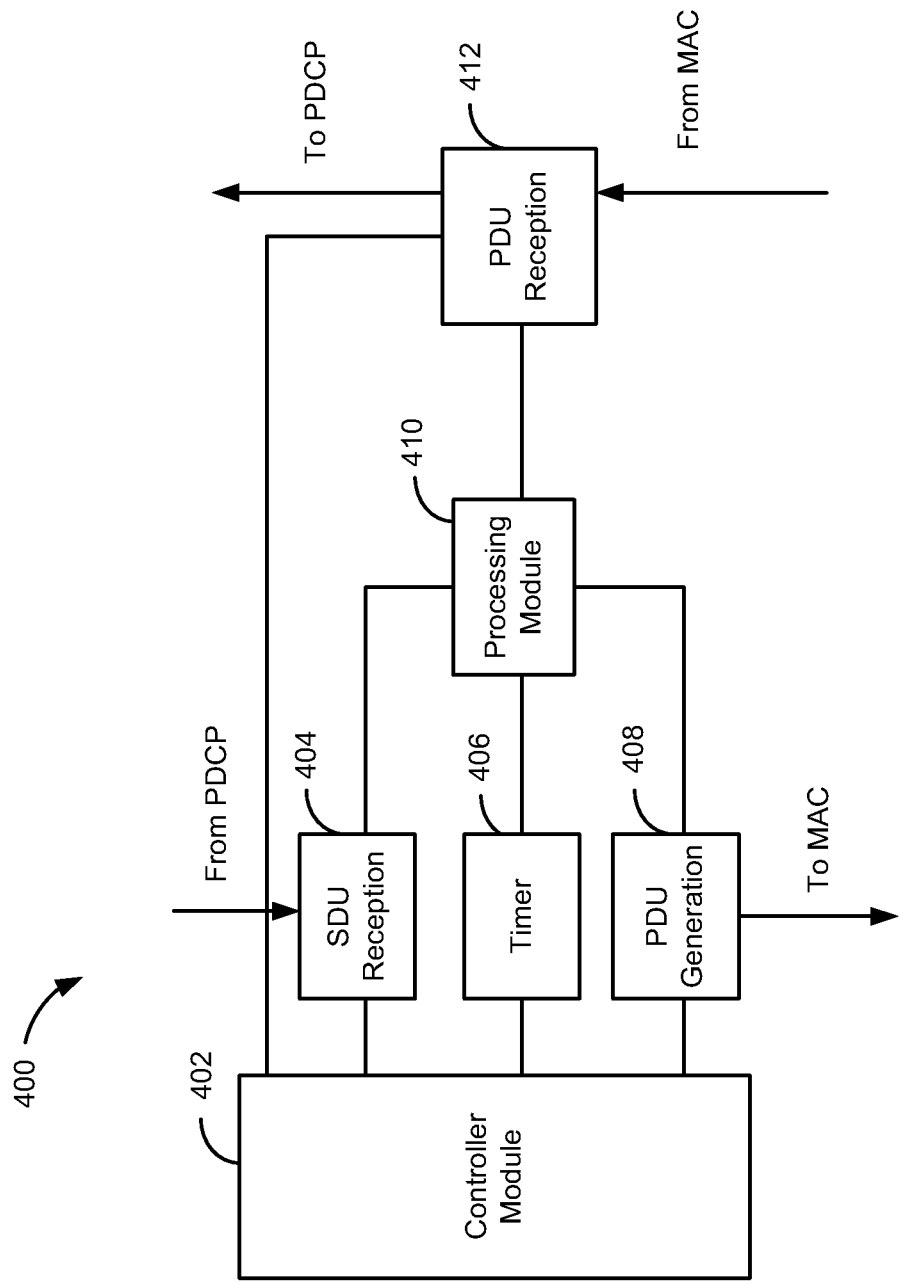
FIG. 4 is a schematic illustration of an example architecture of a single, passive RLC entity with a unified interface.

The radio interface protocol is divided horizontally into a physical layer 302, a data link layer 304, and a network layer 304, and is divided vertically into a user plane (U-Plane) for transmitting data and information and a control plane (C-Plane) used to transfer control signaling. The protocol layers of FIG. 4 are based on the OSI standard model well-known in communication systems, and can thus be divided into layer 1 (L1), layer 2 (L2), and layer 3 (L3), respectively. Such radio protocol layers exist in both the mobile terminal 104 and in the base station 102 as peer entities to handle data transfers over the radio interface.

The physical layer 302 (L1) uses one or more physical channels to provide an information transfer service. The physical layer 302 is coupled with the MAC sub-layer (a sub-layer of L2) 308, located logically above the physical layer 302, via one or more transport channels, and data is transferred between the MAC sub-layer 308 and the physical layer 302 through these transport channels. Here, the transport channels can be divided into dedicated transport channels and common transport channels based on whether the transport channels are shared or not. Also, between respectively different physical layers, such as the physical layer in the transmitter (transmitting side) and the physical layer in the receiver (receiving side), data is transferred via one or more physical channels.

As shown in FIG. 3, there are multiple sub-layers within the data link layer 304 (L2). The MAC sub-layer 308 provides service to a RLC sub-layer 310, which is located logically above the MAC sub-layer 308, via one or more logical channels which are mapped to various transport channels. Also, logical channel multiplexing may be performed for mapping many logical channels to one transport channel. The MAC sub-layer 308 is coupled with the RLC sub-layer 310 via logical channels, which include control channels used to transport control plane information and traffic channels used to transport user plane information.

The RLC sub-layer 310 supports the transmission of data with reliability by performing segmentation and concatenation of data received from an upper layer to adjust the data size to be appropriate for transmission from the lower layer over the radio interface. Also, in order to guarantee the various quality of service (QoS) requirement for each radio bearer (RB), three modes of operation are provided by the RLC sub-layer 310 as introduced above: transparent mode (TM), unacknowledged mode (UM), and acknowledged mode (AM).

The PDCP sub-layer 312 performs a header compression function to reduce the header size for internet protocol (IP) packets. Some IP packets (such as IPv4, IPv6, etc.) contain relatively large and unnecessary control information and the PDCP sub-layer compression allows these packets to be effectively transmitted over a radio interface having relatively small bandwidth. Also, the PDCP sub-layer 312 is used for performing coding of C-plane data, such as radio resource control (RRC) messages. The PDCP sub-layer 312 can also perform coding of U-plane data. In an LTE system, the PDCP sub-layer 312 performs a security function by performing ciphering to prevent third parties from eavesdropping on data transmissions and performing integrity protection to prevent undesired data manipulation by third parties.

L3 306 includes, among other details not depicted, a radio resource control (RRC) layer 314, only defined in the C-plane, which is responsible for the control of logical channels, transport channels, and physical channels with relation to the configuration, re-configuration, and release of radio bearers (RB). Here, a radio bearer is a service or logical path provided by L1 and L2 for transferring data between the mobile terminal and EUTRAN. The establishment of a RB refers to managing the characteristics of the radio protocol layers and channels needed for providing a particular service, and the process of setting the specific parameters and operation methods thereof. The radio bearers can be divided into signaling radio bearers (SRBs) and data radio bearers (DRBs), whereby the SRB is used to transport RRC messages in the C-plane, and the DRB is used to transport user data in the U-plane.

FIG. 4 is a schematic illustration of an example architecture of a single, passive RLC entity with a unified interface according to certain techniques introduced herein. The functions of the RLC sub-layer 310 are carried out by the single, passive RLC entity 400 with a unified interface that can be called by upper and lower layers via a control function. The passive RLC entity 400 includes a RLC control module 402, a SDU reception module 404, a timer 406, a PDU generation module 408, a main processing module 410, and a PDU reception module 412. The single, passive RLC entity 400 provides bi-directional data transfer services for TM data transfer, UM data transfer, and AM data transfer to/from upper layers (e.g., the PDCP sub-layer) through a unified interface. The RLC entity 400 further provides: error correction through automatic repeat request (ARQ); concatenation, segmentation, and reassembly of RLC SDUs; re-segmentation of RLC data PDUs; re-ordering of RLC data PDUs; duplicate detection; RLC SDU discard; RLC re-establishment; and protocol error detection.

As introduced above, the passive RLC entity 400 provides a unified interface to upper/lower layers of the protocol stack. This interface is implemented and managed by the RLC control module 402. The upper/lower layers call the RLC entity 400 through a simple control message including a logic channel identifier (ID) and a flag. The logic channel ID identifies which data transfer mode the request is for (e.g., TM, UM, or AM data transfer) and the flag corresponds to a function that is being requested. Some examples of functions that can be requested with corresponding flags include: receiving a RLC SDU from the PDCP sub-layer; sending a RLC PDU to the MAC sub-layer; receiving a MAC SDU from the MAC sub-layer; and various timing flags. For example, when the PDCP sub-layer 312 is requesting a UM data transfer the PDCP sub-layer 312 will send a control message with a logic channel ID indicating a UM data transfer and a flag indicating the request is for the RLC entity 400 to receive a SDU from the PDCP sub-layer 312.

As depicted in FIG. 4, the SDU reception module 404 is configured to receive RLC SDUs from the PDCP sub-layer 312. The SDU reception module 404 is further configured to save the RLC SDU into a RLC SDU buffer (not shown) and update information related to the SDU buffer in a corresponding data structure. The SDU reception module receives control information from the control module 402. This control information includes, for example, the type of data transfer (i.e., UM, AM, TM, etc.) and requested functions to be performed on data stored in the buffer. The SDU reception module 404 includes an interface with the main processing module 410 which allows the SDU reception module 404 to call the main processing module 410. The main processing module 410 provides functions used by the SDU reception module, as described in more detail below.

The PDU generation module 408 of FIG. 4 is configured to generate a RLC PDU for the MAC sub-layer 308, manage the buffer for RLC PDUs and SDUs, and update information related to the buffer in the corresponding data structure. The PDU generation module 408 communicates with the MAC sub-layer 308 over logical channels in order to transmit the generated PDU. The PDU generation module 408 receives control information from the control module 402. This control information directs the PDU generation module 408 as to which data stored in the buffer is ready to be transmitted and the associated information necessary to generate the PDU (e.g., transmission mode, etc.). The PDU generation module 408 also includes an interface with the main processing module 410. The main processing module 410, as described in more detail below, provides processing functions for the PDU generation module 408 to generate the PDU.

The PDU reception module 412 of FIG. 4 is configured to receive MAC SDUs from the MAC sub-layer 308 and transmit RLC SDUs to the PDCP sub-layer 312 based on control information received from the control module 402. The PDU reception module 412 is also configured to manage the SDU and PDU buffers and update the corresponding data structures related to the buffers. The PDU reception module 412 interfaces with the MAC sub-layer 308 and the PDCP sub-layer 312 through logical channels as introduced above and is known in the art. Similar to the PDU generation module, the PDU reception module 412 calls the main processing module 410 to provide processing functions used in transmitting the RLC SDUs to the PDCP sub-layer 312.

The main processing module 410 provides processing functions to each of the other modules in the passive RLC entity 400. The processing functions provided by the processing module 410 vary based on the requesting module and the transmission mode. For example, in a TM transmission, the processing module 410 does not provide any functions because the RLC entity 400 simply acts as a conduit for the PDUs to flow between the higher/lower layers.

For UM transmissions, the processing module 410 provides the following functions, for example: transmission and reception buffer management; segmentation; concatenation; adding and removing RLC headers; SDU reassembly; and hybrid automatic repeat request (HARQ) reordering. For each PDU in a UM transmission, the processing module 410 adds a PDU header that contains a sequence number and transmits the PDU with the header attached, such that the receiving side can know what PDUs were lost or damaged during transmission. The RLC entity 400 uses these functions to handle broadcast/multicast data and real time data of the packet service (PS) domain such as voice (VoIP) and streaming in the user plane, and the transmission of certain RRC messages in the control plane.

For AM transmissions, the processing module 400 provides those functions discussed above with regard to UM transmissions plus additional RLC control functions and management of a retransmission buffer. Similar to the UM transmission, for an AM transmission, the processing module 410 generates a PDU by adding a PDU header that includes a sequence number. However, the additional functions provided by the processing module 410 take into account the fact that, in an AM transmission, the receiving side provides an acknowledgement that the PDU transmitted from the transmitting side has been received. Thus, in an AM transmission, the receiving side can request the transmitting side to retransmit the PDUs that were not received properly. Thereby, the single, passive RLC entity 400 can also provide the service of guaranteeing error-free data transmissions by using retransmissions. The passive RLC entity 400 uses AM transmission functions to provide non-real time packet data transmissions such as TCP/IP of the PS domain in the user plane, and the transmission of certain RRC messages (that require reception acknowledgements among the RRC messages) in the control plane.

The timer module 406 of FIG. 4 is configured to maintain various timers and to call the implement functions based on the status of those timers. For example, the timer module 406 maintains a reordering timer, a poll retransmit timer, and a status prohibit timer, the functions of which are well known in the art. The timer module 406 interfaces with the processing module 410 and calls the processing module 410 to perform functions based, at least in part, on the status of the timers. The timer module 406 also interfaces with the controller module 402, from which the timer module 406 receives control information.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

What is claimed is:

1. A radio link control (RLC) entity to provide a unified interface to both upper and lower layers of a protocol stack, comprising:
    controller circuitry configured to receive a request for a RLC service of a plurality of RLC services and a logic channel identifier (ID) to identify a data transfer mode associated with the request;
    a processing module coupled with the controller circuitry to process the request based on the data transfer mode; and
    a plurality of data transfer modules comprising circuitry configured to provide data transfer between the upper and lower layers, the data transfer modules coupled with the processing module and the controller circuitry, the plurality of data transfer modules comprising:
        a service data unit (SDU) reception module configured to receive RLC SDUs from the upper layer, to receive first control information from the control circuitry based on the request and the data transfer mode, and to call the processing module to provide first processing functions to process the RLC SDUs:
        a protocol data unit (PDU) generation module configured to generate RLC PDUs based on second control information received from the control circuitry and second processing functions provided by the processing module, and to transmit the generated RLC PDUs to the lower layer; and
        a PDU reception module configured to receive media access control (MAC) SDUs from the lower layer, and transmit RLC SDUs to the upper layer based on third control information received from the control circuitry and third processing functions provided by the processing module.

2. The RLC entity of claim 1, wherein the RLC service, indicated by the data transfer mode of the logic channel ID received by the controller circuitry, is a transport mode (TM) data transfer.

3. The RLC entity of claim 1, wherein the RLC service, indicated by the data transfer mode of the logic channel ID received by the controller circuitry, is an acknowledged mode (AM) data transfer.

4. The RLC entity of claim 1, wherein the RLC service, indicated by the data transfer mode of the logic channel ID received by the controller circuitry, is an unacknowledged mode (UM) data transfer.

5. The RLC entity of claim 1, wherein the unified RLC entity is passive.

6. A base station in a wireless communication system, the base station comprising:
    a physical (PHY) layer;
    a medium access control (MAC) layer;
    a packet data convergence protocol (PDCP) layer; and
    a radio link control (RLC) layer, the RLC layer comprising:
        a passive interface comprising controller circuitry configured to receive a request for a RLC service of a plurality of RLC services and a logic channel identifier (ID) to identify a data transfer mode associated with the request;
        a processing module coupled with the passive interface to process the request based on the data transfer mode; and
        a plurality of data transfer modules comprising circuitry configured to provide data transfer between upper and lower layers, the data transfer modules coupled with the processing module and the passive interface the plurality of data transfer modules comprising:
            a service data unit (SDU) reception module configured to receive RLC SDUs, to receive first control information from the passive interface based on the request and the data transfer mode, and to call the processing module to provide first processing functions to process the RLC SDUs;
            a protocol data unit (PDU) generation module configured to generate RLC PDUs based on second control information received from the passive interface and second processing functions provided by the processing module, and to transmit the generated RLC PDUs; and
            a PDU reception module configured to receive media access control (MAC) SDUs, and transmit RLC SDUs based on third control information received from the control circuitry and third processing functions provided by the processing module.

7. The base station of claim 6, wherein the RLC service, indicated by the data transfer mode of the logic channel ID, is a transport mode (TM) data transfer.

8. The base station of claim 6, wherein the RLC service, indicated by the data transfer mode of the logic channel ID, is an acknowledged mode (AM) data transfer.

9. The base station of claim 6, wherein the RLC service, indicated by the data transfer mode of the logic channel ID, is an unacknowledged mode (UM) data transfer.

* * * * *